(12) United States Patent
Xiao et al.

(10) Patent No.: US 11,146,319 B2
(45) Date of Patent: Oct. 12, 2021

(54) ANTENNA SYSTEM AND DATA PROCESSING METHOD

(71) Applicant: ZTE Corporation, Shenzhen (CN)

(72) Inventors: Jinhuang Xiao, Shenzhen (CN);
Xiaowen Chen, Shenzhen (CN);
Rongjian Xiao, Shenzhen (CN);
Dagang Gong, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/965,115

(22) PCT Filed: Jan. 24, 2019

(86) PCT No.: PCT/CN2019/072954
§ 371 (c)(1),
(2) Date: Jul. 27, 2020

(87) PCT Pub. No.: WO2019/144902
PCT Pub. Date: Aug. 1, 2019

(65) Prior Publication Data
US 2020/0366347 A1 Nov. 19, 2020

(30) Foreign Application Priority Data
Jan. 26, 2018 (CN) .......................... 201810076732.7

(51) Int. Cl.
*H04W 4/02* (2018.01)
*H04B 7/06* (2006.01)
(Continued)

(52) U.S. Cl.
CPC ............ *H04B 7/0608* (2013.01); *H01Q 3/08* (2013.01); *H04B 7/0404* (2013.01); *H04W 4/029* (2018.02); *H04W 84/06* (2013.01)

(58) Field of Classification Search
CPC ...... H04B 7/0404; H04B 7/06; H04B 7/0608; H04B 7/185; H04B 7/1853;
(Continued)

(56) References Cited

U.S. PATENT DOCUMENTS 4,725,843 A * 2/1988 Suzuki ................ H01Q 1/3275
318/649
5,173,708 A * 12/1992 Suzuki ................ H01Q 1/1257
342/359
(Continued)

FOREIGN PATENT DOCUMENTS

CN 101494318 A 7/2009
CN 101944945 A 1/2011
(Continued)

OTHER PUBLICATIONS

International Search Report for corresponding application PCT/CN2019/072954 filed Jan. 24, 2019; dated Apr. 17, 2019.
(Continued)

*Primary Examiner* — Siu M Lee
(74) *Attorney, Agent, or Firm* — Cantor Colburn LLP

(57) ABSTRACT

An antenna system and a data processing method are provided. The system may include: a control module; and a processing module, an information collection module and a transceiver module. The information collection module is configured to collect moving device information and antenna attitude information. The transceiver module is configured to receive a data request instruction through the communication satellite. The control module is configured to determine a request content and a processing time according to the data request instruction, and send the request content, the moving device information and the antenna attitude information to the processing module when the processing time arrives. The processing module is configured to process the moving device information and the
(Continued)

antenna attitude information according to the request content obtain data to be sent corresponding to the request content, and send the data to be sent to the communication satellite through the transceiver module.

20 Claims, 5 Drawing Sheets

(51) Int. Cl.
*H04W 4/029* (2018.01)
*H01Q 3/08* (2006.01)
*H04B 7/0404* (2017.01)
*H04W 84/06* (2009.01)

(58) Field of Classification Search
CPC .......... H04B 7/18532; H04B 7/18569; H04W 4/025; H04W 4/029; H04W 84/06; H01Q 3/08

See application file for complete search history.

(56) References Cited

U.S. PATENT DOCUMENTS

| | | | | |
|---|---|---|---|---|
| 5,629,709 | A | * | 5/1997 | Yamashita ........... H01Q 1/1257 342/359 |
| 6,147,980 | A | | 11/2000 | Yee |
| 7,522,102 | B2 | * | 4/2009 | Shi ..................... H01Q 1/28 342/354 |
| 2009/0180421 | A1 | | 7/2009 | Hall |
| 2011/0215985 | A1 | | 9/2011 | Kaplan |
| 2015/0200449 | A1 | | 7/2015 | Sleight |

FOREIGN PATENT DOCUMENTS

| | | |
|---|---|---|
| CN | 102983402 A | 3/2013 |
| CN | 104079342 A | 10/2014 |
| CN | 104601544 A | 5/2015 |
| CN | 105021191 A | 11/2015 |
| CN | 204967818 U | 1/2016 |
| CN | 105375975 A | 3/2016 |
| CN | 105512479 A | 4/2016 |
| CN | 105680932 A | 6/2016 |
| CN | 106602261 A | 4/2017 |
| CN | 106785442 A | 5/2017 |
| CN | 106921505 A | 7/2017 |
| CN | 107071727 A | 8/2017 |
| JP | 2009284458 A | 12/2009 |
| WO | 2017139067 A1 | 8/2017 |

OTHER PUBLICATIONS

European Sarch Report for corresponding application EP19 74 3236; Report dated Mar. 18, 2021.
Jianwei Zhao, "Beam Tracking for UAV Mounted SatCom on the Move with Massive Antenna Array" Cornell University, Sep. 23, 2017, XP080822909.

* cited by examiner

ANTENNA SYSTEM AND DATA PROCESSING METHOD

TECHNICAL FIELD

The present disclosure relates to the technical field of satellite communication.

BACKGROUND

With the rapid development of communication technologies, communication methods have become diversified. Satellite communication is widely used in ships and other moving devices due to the characteristics of wide coverage, not likeliness to be affected by land disasters, convenient channel conditions, high construction speed, and support for mobile communication. After providing an "earth station in motion" communication satellite antenna on a ship, the ship can establish a communication connection with other devices through a communication satellite, which greatly improves the communication quality.

When a ship supervision department and a land communication satellite communication operator need to monitor the movement trajectory or antenna attitude information of the ship, the "earth station in motion" communication satellite antenna will send the collected ship movement trajectory or antenna attitude information to the ship supervision department and the land communication satellite communication operator through the communication satellite.

However, the transmission bandwidth resources of synchronous orbit communication satellite transponders are limited. Using the above method to transmit ship trajectory or antenna attitude information will waste a lot of communication satellite bandwidth resources.

SUMMARY

An embodiment of the present disclosure provides an antenna system. The antenna system is disposed on a moving device. The moving device is communicatively connected with a communication satellite through the antenna system. The antenna system may include: a control module; and a processing module, an information collection module and a transceiver module, which are connected with the control module. The processing module and the transceiver module are communicatively connected. The information collection module is configured to collect moving device information and antenna attitude information, and send the collected moving device information and antenna attitude information to the control module. The transceiver module is configured to receive a data request instruction through the communication satellite, and send the data request instruction to the control module. The control module is configured to determine a request content and a processing time according to the data request instruction, and send the request content, the moving device information and the antenna attitude information to the processing module when the processing time arrives. The processing module is configured to process the moving device information and the antenna attitude information according to the request content to obtain data to be sent corresponding to the request content, and send the data to be sent to the communication satellite through the transceiver module.

An embodiment of the present disclosure provides a data processing method, applied to an antenna system. The method may include the following operations. A data request instruction is received through a communication satellite. A processing time and a request content are determined according to the data request instruction. Moving device information and antenna attitude information corresponding to the request content are acquired. When the processing time arrives, the moving device information and the antenna attitude information are processed according to the request content to obtain data to be sent corresponding to the request content. The data to be sent is sent to the communication satellite.

An embodiment of the present disclosure provides a computer-readable storage medium having a computer program stored thereon, applied to an antenna system. When the computer program is executed by a processor, the data processing method as described above is implemented.

DETAILED DESCRIPTION OF THE EMBODIMENTS

The technical solutions in the embodiments of the present disclosure will be clearly and completely described hereinbelow with the drawings in the embodiments of the present disclosure.

Figure 1:
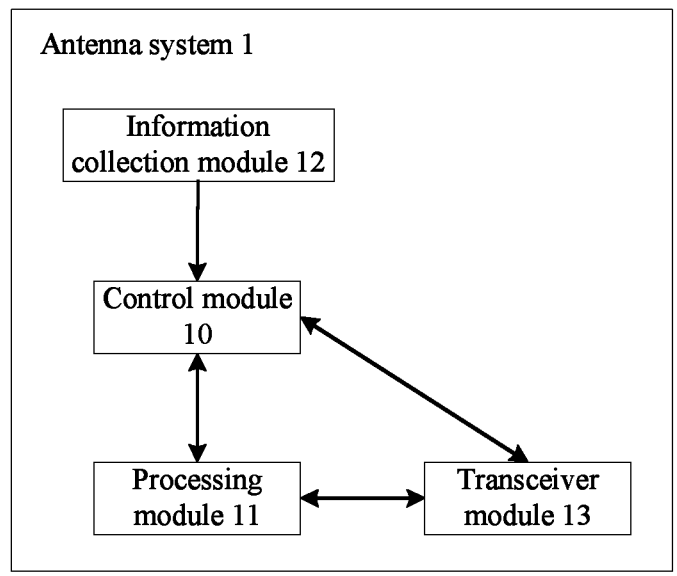
FIG. 1 is a schematic structure diagram of an antenna system according to an embodiment of the present disclosure.

The embodiments of the present disclosure provide an antenna system 1. As shown in FIG. 1, the antenna system 1 is arranged on a moving device. The moving device is communicatively connected with a communication satellite through the antenna system 1. The antenna system 1 may include: a control module 10, and a processing module 11, an information collection module 12 and a transceiver module 13, which are connected with the control module 10.

The processing module 11 and the transceiver module 12 are communicatively connected.

The information collection module 12 is configured to collect moving device information and antenna attitude information, and send the collected moving device information and antenna attitude information to the control module 10.

The transceiver module 13 is configured to receive a data request instruction through the communication satellite, and send the data request instruction to the control module 10.

The control module 10 is configured to determine a request content and a processing time according to the data request instruction, and send the request content, the moving device information and the antenna attitude information to the processing module 11 when the processing time arrives.

The processing module 11 is configured to process the moving device information and the antenna attitude information according to the request content to obtain data to be sent corresponding to the request content, and send the data to be sent to the communication satellite through the transceiver module 13.

In the embodiments of the present disclosure, the antenna system 1 capable to communicating with a communication satellite is arranged on the moving device. The moving device may include ships, cars, trains, airplanes, etc. The moving device may be determined according to actual conditions, and the embodiments of the present disclosure are not specifically limited.

In the embodiments of the present disclosure, the control module 10 may be a Central Processing Unit (CPU), and the processing module 11 may be a Neural-network Process Unit (NPI).

In the embodiments of the present disclosure, the information collection module 12 may include: an Inertial Measurement Unit (IMU), a Global Positioning System (GPS) receiving unit, a sensor unit, a network camera unit, a ship Automatic Identification System (AIS) unit, etc. The components included in the information collection module 12 may be determined according to actual conditions, and the embodiments of the present disclosure are not specifically limited.

In the embodiments of the present disclosure, the IMU may be configured to acquire antenna attitude information including angular velocity, acceleration, magnetic field strength, pressure strength of an antenna, etc. The antenna attitude information may be determined according to actual conditions, and the embodiments of the present disclosure are not specifically limited.

In the embodiments of the present disclosure, the GPS receiving unit may be configured to acquire a movement trajectory of the moving device, and the movement trajectory may include information such as the geographic longitude, latitude, and altitude of the antenna, etc. The movement trajectory of the moving device may be determined according to actual conditions, and the embodiments of the present disclosure are not specifically limited.

In the embodiments of the present disclosure, the sensor unit may include a humidity sensor and a temperature sensor, which are configured to monitor information such as temperature, humidity of the moving device, respectively. The sensor unit may be determined according to actual conditions, and the embodiments of the present disclosure are not specifically limited.

In the embodiments of the present disclosure, the network camera unit may be configured to record an environment of the moving device and personnel activity information. The information recorded by the network camera unit may be determined according to actual conditions, and the embodiments of the present disclosure are not specifically limited.

In the embodiments of the present disclosure, the AIS unit is an alarm system, which is mainly configured to issue an alarm signal when an obstacle is detected within a preset distance, which can prevent the moving device from colliding with other objects.

In the embodiments of the present disclosure, the processing module 11 may be an NPI.

In the embodiments of the present disclosure, the transceiver module may include a communication satellite modem module, a Block Up-Converter (BUC) radio frequency transmitting unit, and a radio frequency antenna unit Low Noise Block (LNB) radio frequency receiving unit. The communication satellite modem module, the BUC radio frequency transmitting unit and the radio frequency antenna unit jointly realize a transmission function, and the radio frequency antenna unit, the LNB radio frequency receiving unit and the communication satellite modem module jointly realize a receiving function.

In the embodiments of the present disclosure, the BUC radio frequency transmitting unit mainly transmits a communication signal in reverse (up-converter), the LNB radio frequency receiving unit mainly receives the communication signal forward (down-converter), and the radio frequency antenna unit mainly sends and receives air interface data from the BUC unit and the LNB unit.

In the embodiments of the present disclosure, the communication satellite sends a data request instruction to the CPU through the radio frequency antenna unit, the LNB radio frequency receiving unit and the communication satellite modem module; the CPU determines a specific content and a processing time of the request according to the data request instruction, and when the processing time arrives, the CPU sends the request content, and moving device information and antenna attitude information collected from the information collection module 12 to the NPI; and the NPI processes the moving device information and the antenna attitude information according to the request content to obtain data to be sent, and finally sends the data to be sent to the communication satellite through the communication satellite modem module, the BUC radio frequency transmission unit and the radio frequency antenna unit.

In the embodiments of the present disclosure, the antenna attitude information may be obtained by the IMU module, and may mainly include the angular velocity, acceleration, magnetic field strength, and pressure strength of the antenna, etc. The antenna attitude information may be determined according to actual conditions, and the embodiments of the present disclosure are not specifically limited.

In the embodiments of the present disclosure, the moving device information may be obtained by the GPS receiver unit, the sensor unit, the network camera unit and the MS unit. The moving device information may include the movement trajectory information of the moving device, the temperature and humidity information of the moving device, the environmental information and alarm information of the moving device, etc. The moving device information may be determined according to actual conditions, and the embodiments of the present disclosure are not specifically limited.

In the embodiments of the present disclosure, the NPI may be configured to model and learn the moving device information and the antenna attitude information to obtain a data analysis result (data to be sent), and send the data analysis result to the communication satellite modem module according to a control instruction of the CPU.

Exemplarily, the communication satellite may send a request instruction for a travel distance to the CPU; when the CPU receives the request instruction, a start position and an end position are determined, and a travel trajectory from the start position to the end position is acquired from the GPS receiver unit, and the CPU sends the travel trajectory to the NPI; and the NPI analyzes a travel distance from the start position to the end position according to the travel trajectory, and sends the travel distance to the communication satellite through the communication satellite modem module, the BUC radio frequency transmitting unit and the radio frequency antenna unit.

Figure 2:
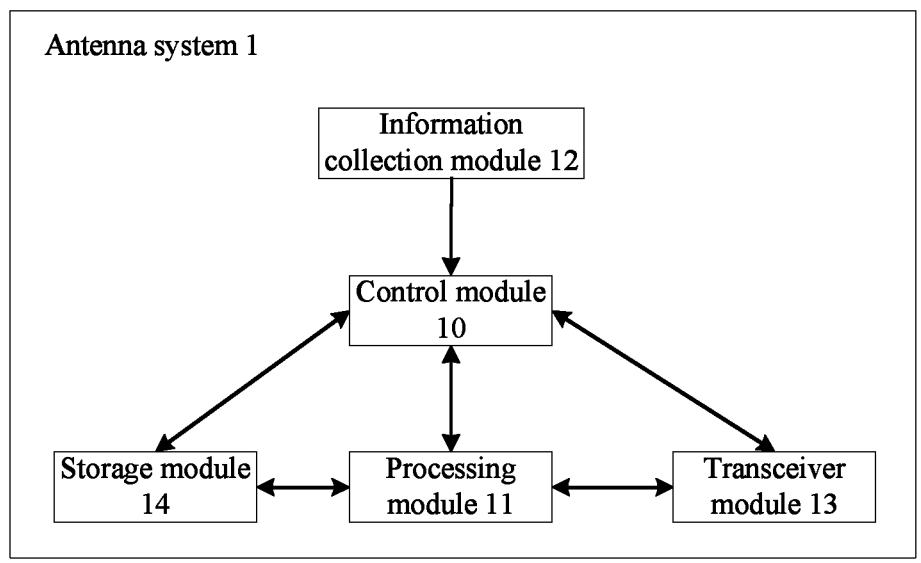
FIG. 2 is another schematic structure diagram of an antenna system according to an embodiment of the present disclosure.

In an embodiment, as shown in FIG. 2, the antenna system 1 may further include: a storage module 14.

The control module 10 may be further configured to send the moving device information and the antenna attitude information to the storage module when the processing time has not arrived, and send the request content to the processing module 11 when the processing time arrives.

The processing module 11 may be further configured to acquire the corresponding moving device information and antenna attitude information from the storage module 14 according to the request content.

In the embodiments of the present disclosure, the information collection module 12 may send the collected moving device information and antenna attitude information to the CPU. When the processing time has not arrived, the CPU stores the antenna attitude information and the moving device information to the storage module 14.

In the embodiments of the present disclosure, when the processing time arrives, the CPU may send the request content to the NPI, and the NPI may determine the moving device information and antenna attitude information corresponding to the request content, and then acquire the moving device information and the antenna attitude information from the storage module 14.

In the embodiments of the present disclosure, the storage module 14 may store the moving device information and the antenna attitude information sent by the CPU, and the data to be sent by the NPI. The content stored by the storage module 14 may be determined according to actual conditions, and the embodiments of the present disclosure are not specifically limited.

In an embodiment, the processing module 11 may be further configured to select, from the moving device information and the antenna attitude information, information to be processed corresponding to the request content, and process the information to be processed according to the request content to obtain the data to be sent.

In the embodiments of the present disclosure, the NPI may be configured to: model and learn information data of the GPS receiver (including but not limited to geographic latitude, longitude, altitude and carrier speed, etc.), output a personalized analysis result of the movement trajectory of a motion carrier, and send the data analysis result to the communication modem module of the communication satellite according to the control instruction of the CPU. The NPI may also be configured to model and learn antenna attitude information data of the IMU inertial test unit (including but not limited to angular velocity, acceleration, magnetic field strength and pressure, etc.), output a personalized analysis result, and send the data analysis result to the communication modem module of the communication satellite according to the control instruction of the CPU. The NPI may also be configured to model and learn various ship monitoring information of the network camera unit (including but not limited to pictures, voice, and streaming media, etc.), output a personalized analysis result, and send the data analysis result to the communication modem module of the communication satellite according to the control instruction of the CPU. The NPI may also be configured to model and learn various ship sensor information of the sensor unit (including but not limited to temperature sensor information, humidity sensor information, etc.), output a personalized analysis result, and send the data analysis result to the communication modem module of the communication satellite according to the control instruction of the CPU. The NPI may also be configured to perform local intelligent analysis on data such as communication and Internet access from Wireless Fidelity (WI-FI) router terminal users, output various personalized analysis results, and store the data analysis results to a local storage module according to the control instruction of the CPU or sent to the communication modem module of the communication satellite.

In an embodiment, the data request instruction may further carry a sending time, and the transceiver module may be further configured to send the data to be sent to the communication satellite when the sending time arrives.

In the embodiments of the present disclosure, after the NPI completely processes the antenna attitude information and the moving device information, the CPU judges whether the sending time has arrived. When the sending time arrives, the CPU instructs the NPI to send the data to be sent to the communication satellite. When the sending time has not yet arrived, the CPU may instruct the NPI to store the data to be sent to the storage module 14. When the sending time arrives, the CPU acquires the data to be sent from the storage module 14 and sends the data to be sent to the communication satellite.

Figure 3:
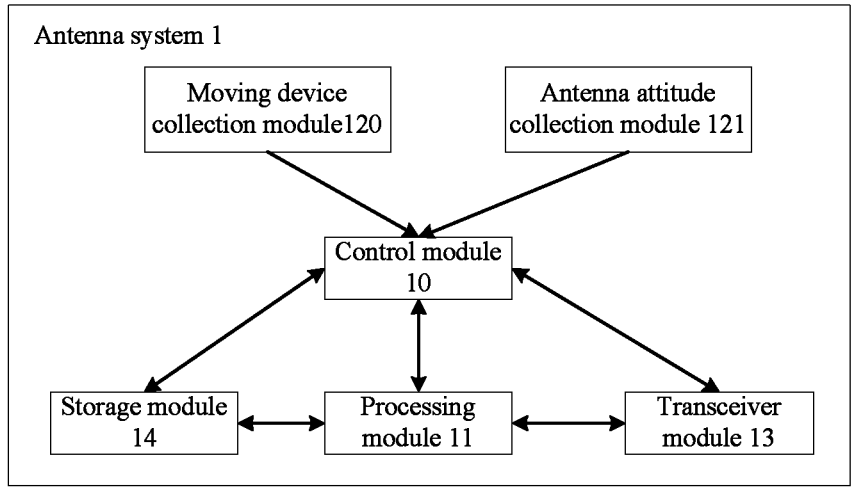
FIG. 3 is another schematic structure diagram of an antenna system according to an embodiment of the present disclosure.

In an embodiment, as shown in FIG. 3, the information collection module 12 may include: a moving device collection module 120 and an antenna attitude collection module 121.

The moving device collection module 120 is configured to collect the moving device information.

The antenna attitude collection module 121 is configured to collect the antenna attitude information.

In the embodiments of the present disclosure, the antenna attitude collection module 121 may be an IMU, and the moving device collection module 120 may include a global positioning receiver unit, a sensor unit, a network camera unit, and an AIS unit. The antenna attitude collection module 121 and the collection module 120 may be determined according to actual conditions, and the embodiments of the present disclosure are not specifically limited.

Figure 4:
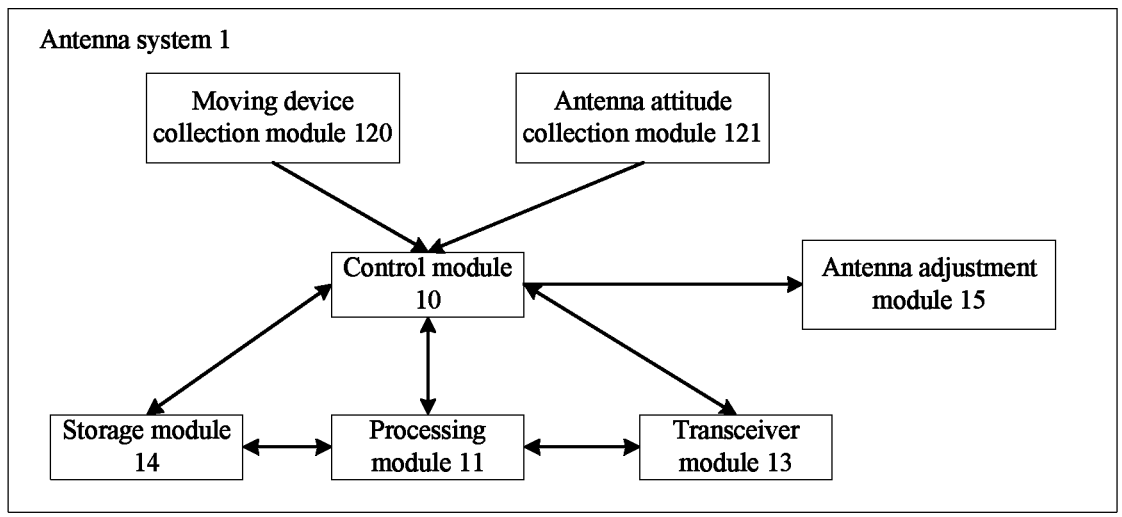
FIG. 4 is another schematic structure diagram of an antenna system according to an embodiment of the present disclosure.

In an embodiment, as shown in FIG. 4, the antenna system 1 may further include: an antenna adjustment module 15.

The antenna adjustment module 15 is configured to adjust an antenna attitude when it is determined that the antenna attitude information changes.

In the embodiments of the present disclosure, due to the instability of the moving device, the posture of the antenna arranged on the moving device may change. When the antenna attitude changes, the antenna may not be able to accurately dock with the communication satellite. In this case, the antenna system 1 and the communication satellite 2 cannot smoothly communicate with each other. Therefore, the antenna adjustment module 15 may be configured to adjust the antenna attitude in real time.

Figure 5:
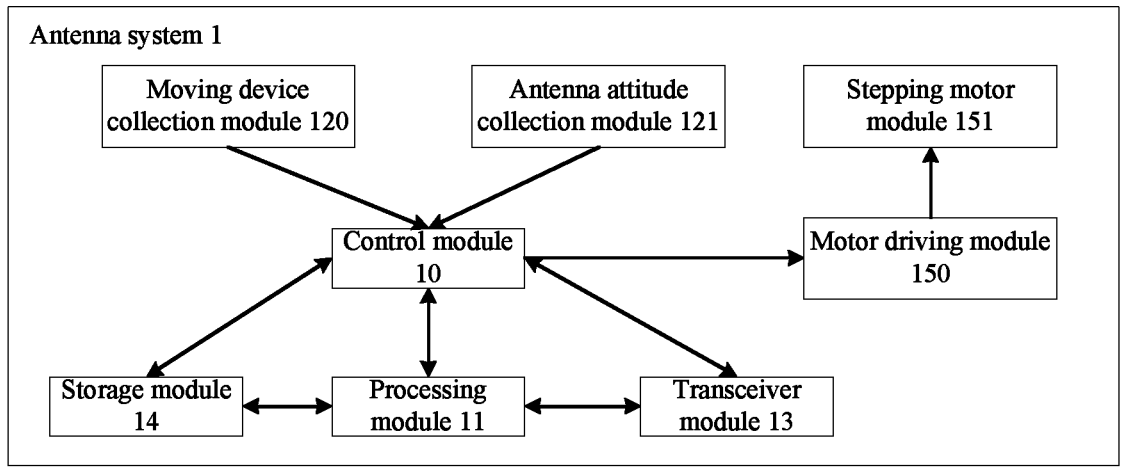
FIG. 5 is another schematic structure diagram of an antenna system according to an embodiment of the present disclosure.

In an embodiment, as shown in FIG. 5, the antenna adjustment module 15 may include: a motor driving module 150 and a stepping motor module 151.

The control module 10 may be further configured to send a control command and rotation angle information of a driving motor to the motor driving module 150 according to the antenna attitude information when it is determined that the antenna attitude information changes.

The motor driving module 150 may be further configured to convert the rotation angle information into a motor driving pulse, and send the motor driving pulse to the stepping motor module 151.

The stepping motor module 151 is configured to adjust the antenna attitude according to the motor driving pulse.

In the embodiments of the present disclosure, the IMU sends the antenna attitude information to the CPU; when the CPU determines that the antenna attitude information changes, the CPU sends rotation angle information and control commands to the motor driving module 150; the motor driving module 150 converts the rotation angle information to a motor driving pulse and sends the motor driving pulse to the stepping motor module 151; and the stepping motor module 151 adjusts an antenna attitude according to the motor driving pulse.

In an embodiment, the transceiver module 13 may be further configured to send current transmission channel information to the processing module 11.

The processing module 11 may be further configured to process the current transmission channel information, and send the processed current transmission channel information to the communication satellite through the transceiver module 13.

In the embodiments of the present disclosure, a communication satellite modem sends data such as channel quality, received signal-to-noise ratio, and uplink and downlink data rate statistics to the NPI; the NPI models and learns the received data, outputs a personalized analysis result, and stores the data analysis result in the local storage module according to the control instruction of the CPU or sends the data analysis result to the communication modem module of the communication satellite.

Figure 6:
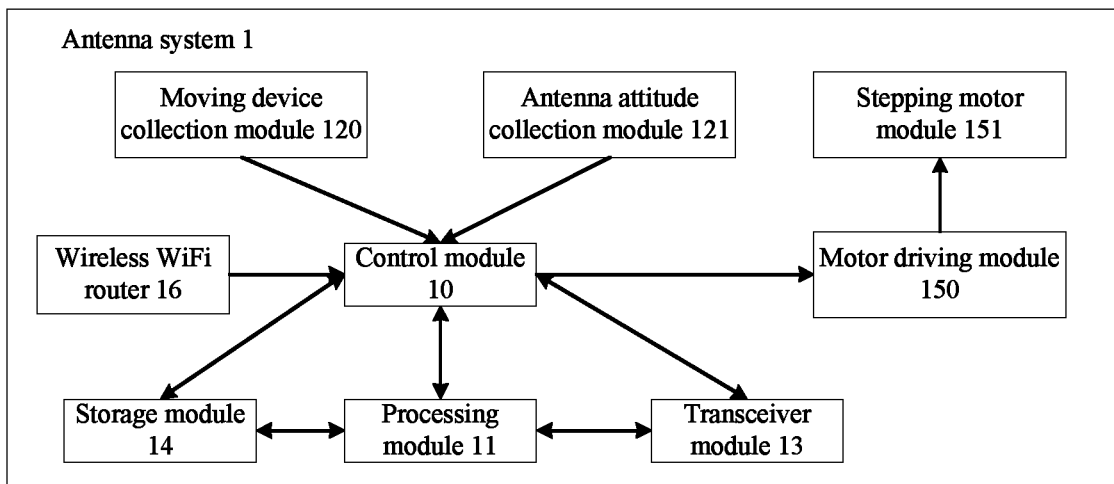
FIG. 6 is another schematic structure diagram of an antenna system according to an embodiment of the present disclosure.

In an embodiment, as shown in FIG. 6, the antenna system 1 may further include a wireless Wi-Fi router 16. A terminal may access the antenna system 1 through the wireless Wi-Fi router 16, and the terminal accessing the antenna system 1 may establish a communication connection with other devices through the communication satellite.

Figure 7:
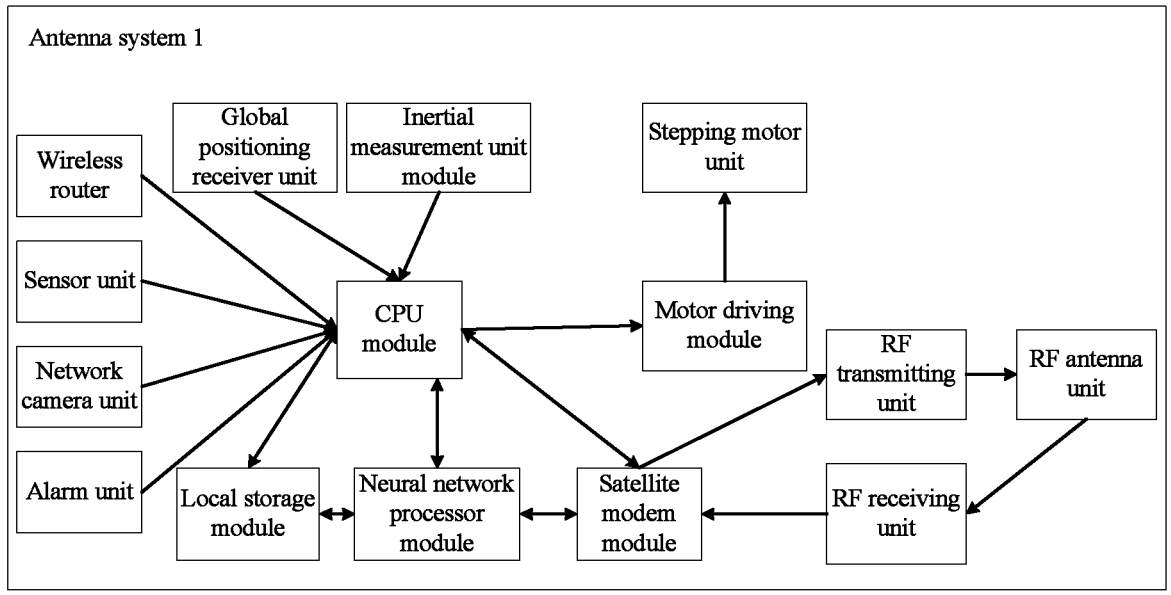
FIG. 7 is yet another schematic structure diagram of an antenna system according to an embodiment of the present disclosure.

Exemplarily, as shown in FIG. 7, the antenna system may include: a central processing module, a neural network processor module, a communication satellite modem module, a local storage module, a motor driving module, a local storage module, a radio frequency transmitting unit, a radio frequency receiving unit, a radio frequency antenna unit, a stepping motor unit, an inertial measurement unit, a GPS receiver unit, a wireless router, a sensor unit, a network camera unit, and an alarm unit.

It can be understood that when the data request instruction is obtained through the transceiver module, the control module may instruct the processing module to process the moving device information and the antenna attitude information according to the data request instruction to obtain data to be sent, and send the data to be sent to the communication satellite. As a result, the antenna system does not need to send all the moving device information and antenna attitude information to the communication satellite, but only needs to send a processing result (that is, the data to be sent) to the communication satellite, thereby reducing the bandwidth resources occupied by data transmission and greatly saving the bandwidth resources of the communication satellite.

Figure 8:
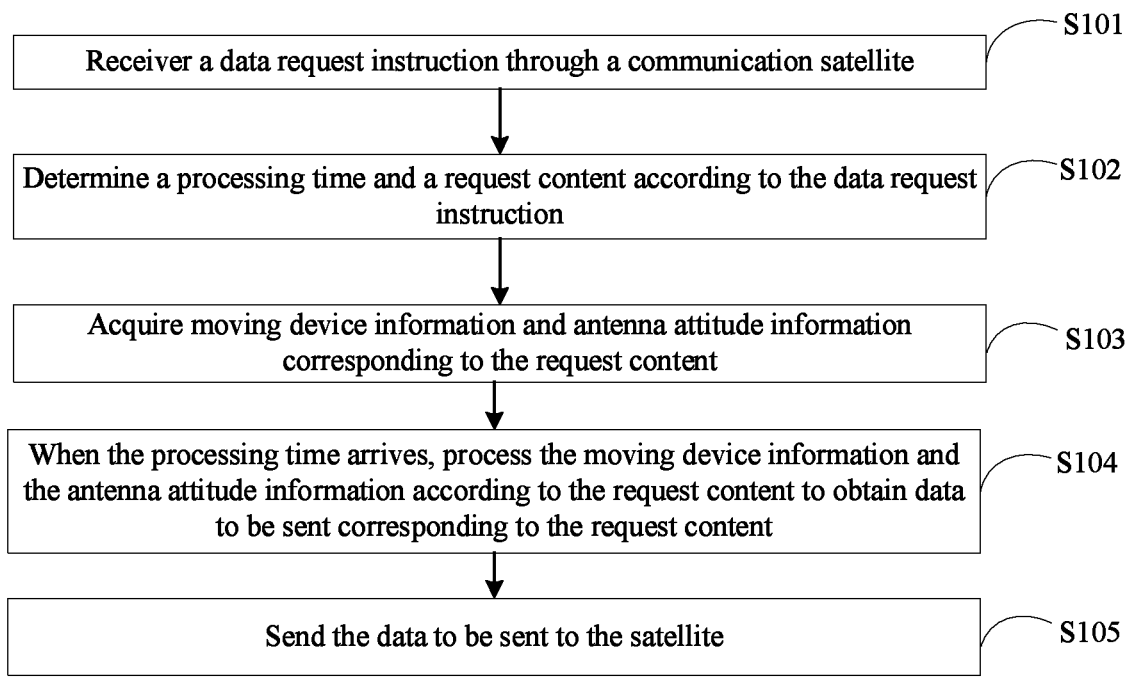
FIG. 8 is a flowchart of a data processing method according to an embodiment of the present disclosure.

FIG. 8 is a flowchart of a data processing method according to an embodiment of the present disclosure. The method may be applied to an antenna system 1, and suitable for a scenario where relevant information of a moving device is acquired through a communication satellite. As shown in FIG. 8, the method may include: operations S101-S105.

At operation S101, a data request instruction is received through a communication satellite.

In the embodiments of the present disclosure, a land big data processing center sends a data request instruction to the communication satellite, and the communication satellite sends a data request instruction to the antenna system.

In the embodiments of the present disclosure, the antenna system is arranged on the moving device. The moving device may include ships, cars, trains, airplanes, and the like. The moving device may be determined according to actual conditions, and the embodiments of the present disclosure are not specifically limited.

At operation S102, a processing time and a request content are determined according to the data request instruction.

In the embodiments of the present disclosure, the data request instruction carries a processing time and a request content. When the antenna system receives the data request instruction, the data request instruction may acquire the processing time and the request content from the data request instruction.

At operation S103, moving device information and antenna attitude information corresponding to the request content are acquired.

When the antenna system determines the processing time and the request content, the antenna system may acquire moving device information and antenna attitude information corresponding to the request content.

In the embodiments of the present disclosure, the antenna system stores the collected moving device information and antenna attitude information to a storage module, and the antenna system acquires the moving device information and antenna attitude information corresponding to the request content from the storage module.

In the embodiments of the present disclosure, the antenna attitude information may include the angular velocity, acceleration, magnetic field strength, and pressure strength of an antenna, etc. The antenna attitude information may be determined according to actual conditions, and the embodiments of the present disclosure are not specifically limited.

In the embodiments of the present disclosure, the moving device information may include the movement trajectory information of the moving device, the temperature and humidity information of the moving device, the environmental information and alarm information of the moving device, etc. The moving device information may be determined according to actual conditions, and the embodiments of the present disclosure are not specifically limited.

In the embodiments of the present disclosure, after acquiring the antenna attitude information, the antenna system judges whether the antenna attitude information changes. When the antenna attitude information changes, the antenna system may adjust the antenna attitude.

In the embodiments of the present disclosure, adjusting the antenna attitude may include, for example, adjusting the antenna attitude upward, downward, leftward, and rightward. The adjustment may be determined according to actual conditions, and the embodiments of the present disclosure are not specifically limited.

At operation S104, when the processing time arrives, the moving device information and the antenna attitude information are processed according to the request content to obtain data to be sent corresponding to the request content.

After the antenna system acquires the moving device information and the antenna attitude information, the antenna system waits for the processing time to arrive. When the processing time arrives, the antenna system processes the moving device information and the antenna attitude information according to the request content to obtain data to be sent corresponding to the request content.

In the embodiments of the present disclosure, when the processing time arrives, the antenna system uses a neural network model to process the motion information and the antenna attitude information to obtain the data to be sent corresponding to the request content.

At operation S105, the data to be sent is sent to the communication satellite.

After the antenna system obtains the data to be sent, the antenna system may send the data to be sent to the communication satellite.

In the embodiments of the present disclosure, the antenna system encodes the data to be sent, modulates the encoded data to be sent into L-band data, modulates the L-band data into a radio frequency signal, and then sends the radio frequency signal to the communication satellite through a communication satellite radio frequency antenna.

In the embodiments of the present disclosure, the communication satellite band may include a C band, a KU band, and a KA band. The communication satellite band may be selected according to actual conditions, and the embodiments of the present disclosure are not specifically limited.

Figure 9:
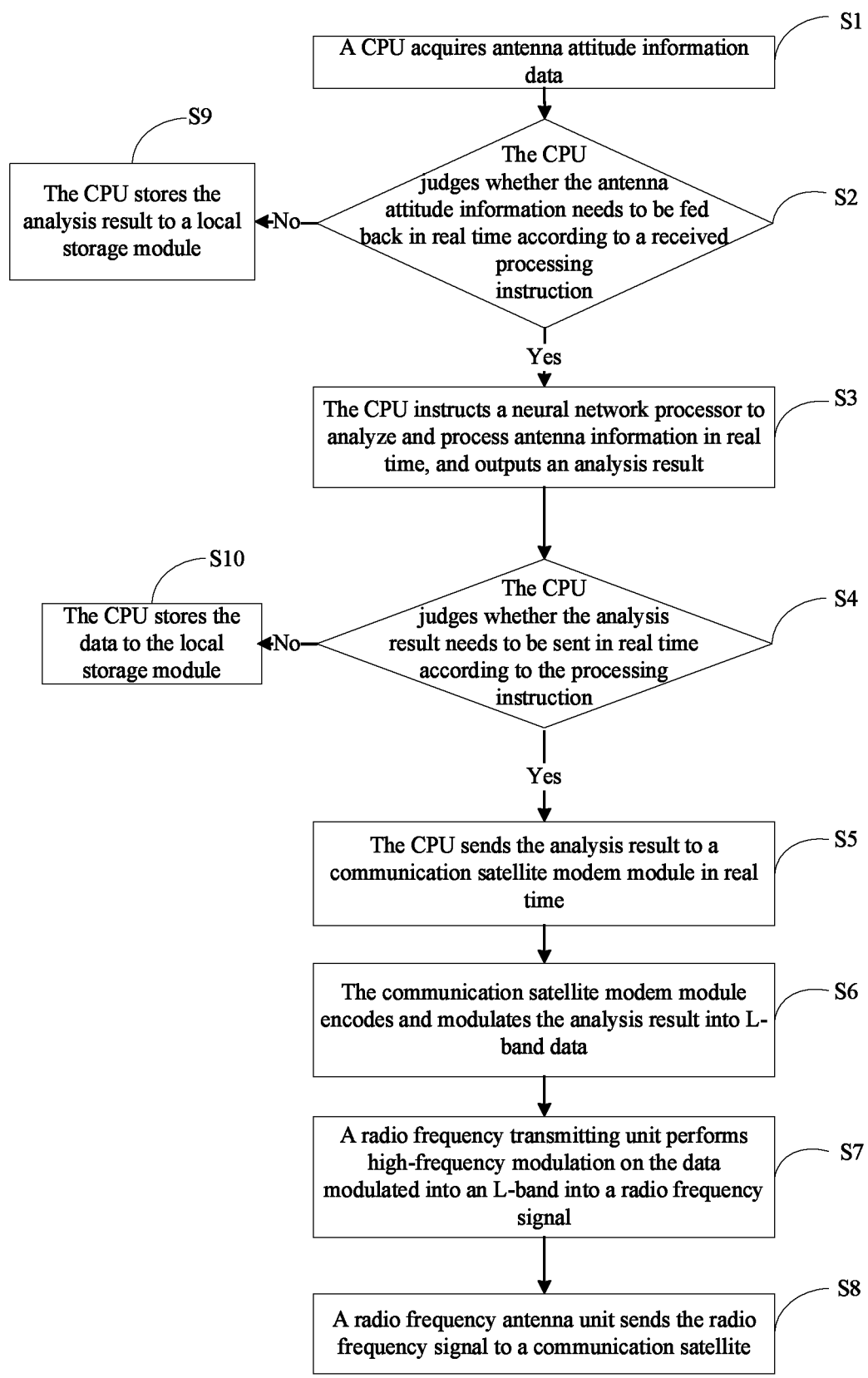
FIG. 9 is another flowchart of a data processing method according to an embodiment of the present disclosure.

FIG. 9 is another flowchart of a data processing method according to an embodiment of the present disclosure. As shown in FIG. 9, the data processing method may include operations S1-S10.

At operation S1, a CPU acquires antenna attitude information data.

At operation S2, the CPU judges whether the antenna attitude information needs to be fed back in real time according to a received processing instruction.

At operation S3, when the CPU determines that the antenna attitude information needs to be fed back in real time, the CPU instructs a neural network processor to analyze and process antenna information in real time, and outputs an analysis result.

At operation S4, the CPU judges whether the analysis result needs to be sent in real time according to the processing instruction.

At operation S5, when the CPU determines that the analysis result needs to be sent in real time, the CPU sends the analysis result to a communication satellite modem module in real time.

At operation S6, the communication satellite modem module encodes and modulates the analysis result into L-band data.

At operation S7, a radio frequency transmitting unit performs high-frequency modulation on the data modulated into an L-band into a radio frequency signal.

At operation S8, a radio frequency antenna unit sends the radio frequency signal to a communication satellite.

At operation S9, when the CPU determines that the analysis result does not need to be sent in real time, the CPU stores the analysis result to a local storage module.

At operation S10, when the CPU determines that the antenna attitude information does not need to be fed back in real time, the CPU stores the data to the local storage module.

It can be understood that when the data request instruction is obtained through the transceiver module, the control module may instruct the processing module to process the moving device information and the antenna attitude information according to the data request instruction to obtain data to be sent, and send the data to be sent to the communication satellite. As a result, the antenna system does not need to send all the moving device information and antenna attitude information to the communication satellite, but only needs to send a processing result (that is, the data to be sent) to the communication satellite, thereby reducing the bandwidth resources occupied by data transmission and greatly saving the bandwidth resources of the communication satellite.

A person skilled in the art should understand that the embodiments of the present disclosure may be provided as a method, a server or a computer program product. Therefore, the present disclosure may be implemented in the form of hardware, software, or a combination of both. The present disclosure may be further implemented as the form of a computer program product implemented on one or more computer available storage media (including, but not limited to, a disk memory, an optical memory and the like) containing computer available program codes.

The present disclosure is described with reference to flowcharts and/or block diagrams of the method, the device (server) and the computer program product according to the embodiments of the present disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation operations on the computers or the other programmable devices, and therefore the instructions executed on the computers or the other programmable devices provide a step of achieving the functions designated in one or more flows of the flowcharts and/or one or more blocks of the block diagrams.

The above is only the exemplary embodiment of the present disclosure and is not intended to limit the scope of the present disclosure.

What is claimed is:

1. An antenna system, disposed on a moving device, wherein the moving device is communicatively connected with a communication satellite through the antenna system, and the antenna system comprises: a control module; and a processing module, an information collection module and a transceiver module, which are connected with the control module, wherein the processing module and the transceiver module are communicatively connected;

the information collection module is configured to collect moving device information and antenna attitude information, and send the collected moving device information, and send the collected moving device information and antenna attitude information to the control module;

the transceiver module is configured to receive a data request instruction through the communication satellite, and send the data request instruction to the control module;

the control module is configured to determine a request content and a processing time according to the data request instruction, and send the request content, the moving device information and the antenna attitude information to the processing module when the processing time arrives; and the processing module is configured to process the moving device information and the antenna attitude information according to the request content to obtain data to be sent corresponding to the request content, and send the data to be sent to the communication satellite through the transceiver module.

2. The system according to claim 1, further comprising: a storage module, wherein the control module is further configured to send the moving device information and the antenna attitude information to the storage module when the processing time has not arrived, and send the request content to the processing module when the processing time arrives; and the processing module is further configured to acquire the corresponding moving device information and the antenna attitude information from the storage module according to the request content.

3. The system according to claim 1, wherein the processing module is further configured to select, from the moving device information and the antenna attitude information, information to be processed corresponding to the request content, and process the information to be processed according to the request content to obtain the data to be sent.

4. The system according to claim 1, wherein the data request instruction further carries a sending time, and the transceiver module is further configured to send the data to be sent to the communication satellite when the sending time arrives.

5. The system according to claim 1, wherein the information collection module comprises: a moving device collection module and an antenna attitude collection module, and wherein the moving device collection module is configured to collect the moving device information; and the antenna attitude collection module is configured to collect the antenna attitude information.

6. The system according to claim 1, further comprising: an antenna adjustment module, wherein the antenna adjustment module is configured to adjust an antenna attitude when it is determined that the antenna attitude information changes.

7. The system according to claim 6, wherein the antenna adjustment module comprises: a motor driving module and a stepping motor module, and wherein the control module is further configured to send a control command and rotation angle information of a driving motor to the motor driving module according to the antenna attitude information when it is determined that the antenna attitude information changes;

the motor driving module is further configured to convert the rotation angle information into a motor driving pulse, and send the motor driving pulse to the stepping motor module; and the stepping motor module is further configured to adjust the antenna attitude according to the motor driving pulse.

8. The system according to claim 1, wherein the transceiver module is further configured to send current transmission channel information to the processing module; and the processing module is further configured to process the current transmission channel information, and send the processed current transmission channel information to the communication satellite through the transceiver module.

9. The system according to claim 1, wherein the antenna system further comprises:

a wireless Wi-Fi router, through which a terminal accesses the antenna system, wherein the terminal accessing the antenna system establishes a communication connection with other devices through the communication satellite.

10. The system according to claim 1, wherein the control module is configured to acquire the processing time and the request content from the data request instruction, wherein the data request instruction carries the processing time and the request content.

11. The system according to claim 1, wherein the antenna attitude information comprises at least one of: angular velocity, acceleration, magnetic field strength, and pressure strength of an antenna;

or, the moving device information comprises at least one of: movement trajectory information of the moving device, temperature and humidity information of the moving device, environmental information and alarm information of the moving device.

12. The system according to claim 1, wherein the processing module is configured to, when the processing time arrives, use a neural network model to process the moving device information and the antenna attitude information to obtain the data to be sent corresponding to the request content.

13. The system according to claim 1, wherein the processing module is configured to encode the data to be sent, modulate the encoded data to be sent into L-band data, modulate the L-band data into a radio frequency signal, and then send the radio frequency signal to the communication satellite through a communication satellite radio frequency antenna.

14. A data processing method, applied to an antenna system, the method comprising:

receiving a data request instruction through a communication satellite;

determining a processing time and a request content according to the data request instruction;

acquiring moving device information and antenna attitude information corresponding to the request content;

processing, when the processing time arrives, the moving device information and the antenna attitude information according to the request content to obtain data to be sent corresponding to the request content; and sending the data to be sent to the communication satellite.

15. The method according to claim 14, wherein after acquiring corresponding moving device information and antenna attitude information according to the request content, the method further comprises:
adjusting an antenna attitude when it is determined that the antenna attitude information changes.

16. A non-transitory computer-readable storage medium, having a computer program stored thereon, applied to an antenna system, wherein the computer program is executed by a processor to implement the method according to claim 14.

17. The method according to claim 14, wherein determining a processing time and a request content according to the data request instruction comprises:
acquiring the processing time and the request content from the data request instruction, wherein the data request instruction carries the processing time and the request content.

18. The method according to claim 14, wherein the antenna attitude information comprises at least one of: angular velocity, acceleration, magnetic field strength, and pressure strength of an antenna;
or,
the moving device information comprises at least one of: movement trajectory information of a moving device, temperature and humidity information of the moving device, environmental information and alarm information of the moving device.

19. The method according to claim 14, wherein processing, when the processing time arrives, the moving device information and the antenna attitude information according to the request content to obtain data to be sent corresponding to the request content comprises:
when the processing time arrives, using, by the antenna system, a neural network model to process the moving device information and the antenna attitude information to obtain the data to be sent corresponding to the request content.

20. The method according to claim 14, wherein sending the data to be sent to the communication satellite comprises:
encoding, by the antenna system, the data to be sent, modulating, by the antenna system, the encoded data to be sent into L-band data, modulating, by the antenna system, the L-band data into a radio frequency signal, and then sending, by the antenna system, the radio frequency signal to the communication satellite through a communication satellite radio frequency antenna.

* * * * *